3,049,557
TELOMERIZATION OF UNSATURATED HYDRO-
CARBONS WITH MONO-ALPHA-SUBSTITUTED
CARBOXYLIC ACID ESTERS OF BETA-NEO
POLYALCOHOLS AND TELOMERIC PRODUCTS
OBTAINED THEREBY
Donald D. Emrick, Shaker Heights, Ohio, assignor to
The Standard Oil Company, Cleveland, Ohio, a corporation of Ohio
No Drawing. Filed May 23, 1960, Ser. No. 30,761
19 Claims. (Cl. 260—410.6)

This invention relates to a process for telomerization of low molecular weight olefins with mono-alpha-substituted carboxylic acid esters of beta-neo polyalcohols and more particularly to the telomerization of alpha-olefins such as ethylene with mono-alpha-substituted carboxylic acid esters derived from beta-neo polyalcohols in the presence of a free radical initiator, and to the free-flowing liquid telomers thereby obtained, which have properties adapting them for use as synthetic lubricants alone and in blends with mineral lubricating oils.

In recent years, a number of synthetic (i.e., not petroleum-derived) lubricants have been made available to meet special needs in the field of lubrication. Such lubricants have considerably improved properties, as compared to mineral lubricating oils derived from petroleum, and these properties have made it quite clear that such synthetic lubricants will continue to find a wide field of utility in those applications where petroleum-derived lubricants have not proved completely satisfactory.

Olefins undergo a reaction known as telomerization which has been described in numerous patents and publications. Large amounts of ethylene and propylene are available from petroleum refinery gases, or are made readily on cracking hydrocarbons. These constitute a good source of cheap raw material for making new products, such as telomers.

Telomerization involves the reaction of the olefin, called a taxogen, with a fragment of another molecule, known as a telogen, and the product of this reaction is called a telomer. The reaction can be defined by the following equation:

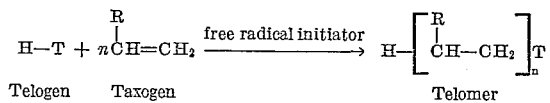

Telogen   Taxogen                              Telomer

R is hydrogen or an alkyl, aryl, mixed alkyl aryl, mixed aryl alkyl, or cycloalkyl radical.

Telomers are different from copolymers and interpolymers. Copolymers and interpolymers contain a number of each of two or more different monomer units in the main polymer chain, whereas the fragments of another molecule (the telogen) in telomers appear as units at the terminals of the main polymer chain. Telomerization differs from simple free radical addition to the double bond of an olefin in that more than one molecule of the olefin appears in the product. The telomerization reaction proceeds in the presence of a free radical initiator which removes an active hydrogen from the telogen. The resulting radical initiates the telomerization by adding to the double bond of the olefin.

U.S. Patents No. 2,433,015 and No. 2,433,016, dated December 23, 1947, to Roland et al. and Coffman, respectively, show the reaction of olefin taxogens such as ethylene with organic carboxylic acid telogens to produce high molecular weight telomers. Acid esters may be formed from these higher acidic telomeric products by reaction of the carboxylic acid groups with alcohols, thus converting the telomer into a wax or wax adjunct, solid materials which show a wide range of compatibility with other waxes and wax solvents. The esterification reaction is difficult to carry out to completion because the telomeric acids are highly branched, and the alpha-branched chains sterically hinder the carboxylic acid groups. In order to esterify such acids, it is possible to proceed via the acid chloride, but this is an expensive procedure, and in addition introduces an extra step.

U.S. Patent No. 2,402,137 to Hanford et al., dated June 18, 1946, shows the preparation of telomers from ethylene as the taxogen with oxygenated organic compounds, such as alcohols, aldehydes, ketones, acids, esters, acid anhydrides, ethers and acetals, as the telogen. The telomeric products are solids ranging in consistency from soft greases to hard waxes. The preparation of liquid products is not disclosed either in this patent or in Nos. 2,433,015 and 2,433,016.

In the process of the invention, improved synthetic lubricants and lubricant blending agents are provided by telomerizing an alpha-olefin taxogen with a mono-alpha-substituted carboxylic acid ester of a beta-neo polyalcohol as the telogen, in the presence of a free radical initiator. The product is a free-flowing liquid olefin telomer having a molecular weight below 2,000, and preferably below 1,000, containing beta-neo polyalcohol-carboxylic acid ester units attached to a polymeric olefin-derived hydrocarbon unit.

The term "beta-neo polyalcohol" refers to alcohols having two or more hydroxyl groups and a neo group adjacent each hydroxyl group, of the type

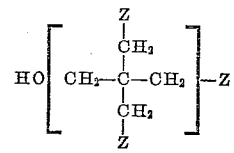

Z is monovalent and is selected from the group consisting of hydrogen, hydroxyl, beta-neo hydroxy aliphatic, aliphatic hydrocarbon, aliphatic, carboxylic ester and cyclic groups such as aromatic, mixed aliphatic aromatic, cycloaliphatic and heterocyclic groups, and halogen-containing derivatives of these radicals; at least one of the three Z radicals is or contains a hydroxyl group. The neo group is within the brackets, and the neo carbon is the carbon at the center of the neo group, whose four valences are attached to the other four carbons of the neo group. The neo carbon is beta to the hydroxyl group.

The preferred telomeric products of the invention are viscous liquids or oils having a viscosity of not over 2000 SSU at 100° F., and preferably not over 1000 SSU at 100° F. (approximately an SAE No. 50 lubricating oil).

These telomers are intended to be used as a lubricant per se, or as a lubricant base for a lubricating oil in blends with other lubricants, or with lubricant additives. It is believed that they will find their primary use as lubricants, not as typical lubricant additives.

They are compatible with mineral oil at a rather high level of solubility, usually completely miscible.

The telomers of the invention are fluids because of their relatively low molecular weight, and the highly branched structure of the beta-neo polyalcohol and carboxylate groups. This branching reduces the pour point of the telomer for a given molecular weight.

There is a neo group on the polyalcohol portion of the telomer molecule adjacent to the oxygen atom of each esterified alcoholic hydroxy group. Such groups may also be present in the organic carboxylic acid portion of the telomer molecule. There must be neo carbon atoms beta to each alcoholic oxygen attached to each ester group, as required, in order to place the ester groups more than three carbons apart (the length of one beta-neo group). One hydroxyl group of the neopentyl polyalcohol may remain unesterfiied.

The beta-neo group considerably increases stability of the telomer to high temperatures. This is because the neo carbon has no hydrogen and cannot serve as a reaction site for olefin degradation by loss of $H_2O$ with the alpha-hydroxy group. As is well known, aliphatic alcohol esters of unbranched carboxylic acids are not ordinarily very stable in the presence of acids, readily undergoing de- and transesterification. Such instability renders such esters less satisfactory as lubricants, because lubricants must be capable of withstanding decomposition and/or polymerization at the high temperatures and acid conditions to which they would be subjected in use in internal combustion engines and the like. The beta-neo telomers of the invention meet the requirements for heat stability usually required of lubricants, because they are sterically hindered esters of highly alpha-substituted acids, and lack a hydrogen ligand on the carbon beta to the alcoholic oxygen.

The telogen of the invention is a mono-alpha-substituted carboxylic acid ester of a polyol having a beta-neo group in the molecule, the ester usually having at least one labile hydrogen atom alpha to the carbonyl carbon of the carboxylic acid radical, and the neo group being beta to each ester group. The telogen can be defined by the following general formula:

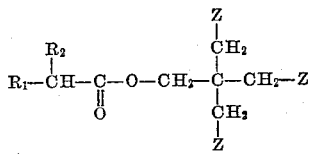

Z is a monovalent radical having up to twenty-two carbon atoms and only atoms selected from carbon, hydrogen, oxygen, and halogen, and is selected from the group consisting of hydrogen, hydroxyl, beta-neo hydroxy aliphatic, aliphatic hydrocarbon and aliphatic carboxylic ester groups, particularly of the type:

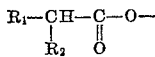

and cyclic groups such as aromatic, mixed aliphatic aromatic, cycloaliphatic and heterocyclic groups and halogen-containing derivatives of these radicals. At least one Z radical is or contains a hydroxyl group.

$R_1$ and $R_2$ are selected from the group consisting of aliphatic, aromatic, mixed aliphatic aromatic, cycloaliphatic and heterocyclic groups collectively having a total of from one to twenty-two carbon atoms. At least one of $R_1$ and $R_2$ is a hydrocarbon radical, the remaining R may contain halogen and/or up to eight oxygenated groups such as ether and hydroxyl groups.

Typical $R_1$ and $R_2$ radicals are methyl, ethyl, n-propyl, isopropyl, n-butyl, isobutyl, secondary butyl, tertiary butyl, n-amyl, isoamyl, tertiary amyl, n-hexyl, isohexyl, phenyl, xylyl, benzyl, beta-phenylethyl, alpha-phenylethyl, tolyl, ethylphenyl, cycohexyl, methylcyclohexyl, cyclopentyl, cycloheptyl, 2-ethyhexl, n-heptyl, tert-heptyl, n-octyl, isooctyl, tert-octyl, n-nonyl, tert-nonyl, n-decyl, tert-decyl, pyridyl, furyl, and piperidyl.

Typical Z radicals include any of the above R radicals, carboxylic ester radicals including the above R radicals, and the beta-neo hydroxyalkyl groups derived from any of the beta-neo polyols mentioned below.

The above esters are derived from the corresponding beta-neo polyalcohols and organic carboxylic acids. The alcohols may contain from five to fifteen carbon atoms and from two to eight hydroxyl groups, and the acids may contain from two to tweny-two carbon atoms, preferably four or more, and at most two carboxylic acid groups, preferably only one.

Examples of suitable beta-neo polyols include neopentyl glycol, pentaerythritol and its condensation products, di- and tripentaerythritol, trimethylolpropane, trimethylolbutane, 2-butyl-2-ethylpropanediol-1,3, 2-methyl-2-ethyl propanediol-1,3, and 2,2-diethyl propanediol-1,3.

Preferred organic carboxylic acids include isobutyric acid, alpha-methylvaleric acid, alpha ethylbutyric acid, alpha-ethylhexoic acid, phenylacetic acid,

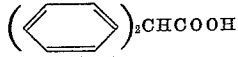

bis(phenyl) acetic acid, cyclohexyl acetic acid, and alpha-phenyl butyric acid.

Exemplary neopentyl ester telogens of the invention are:

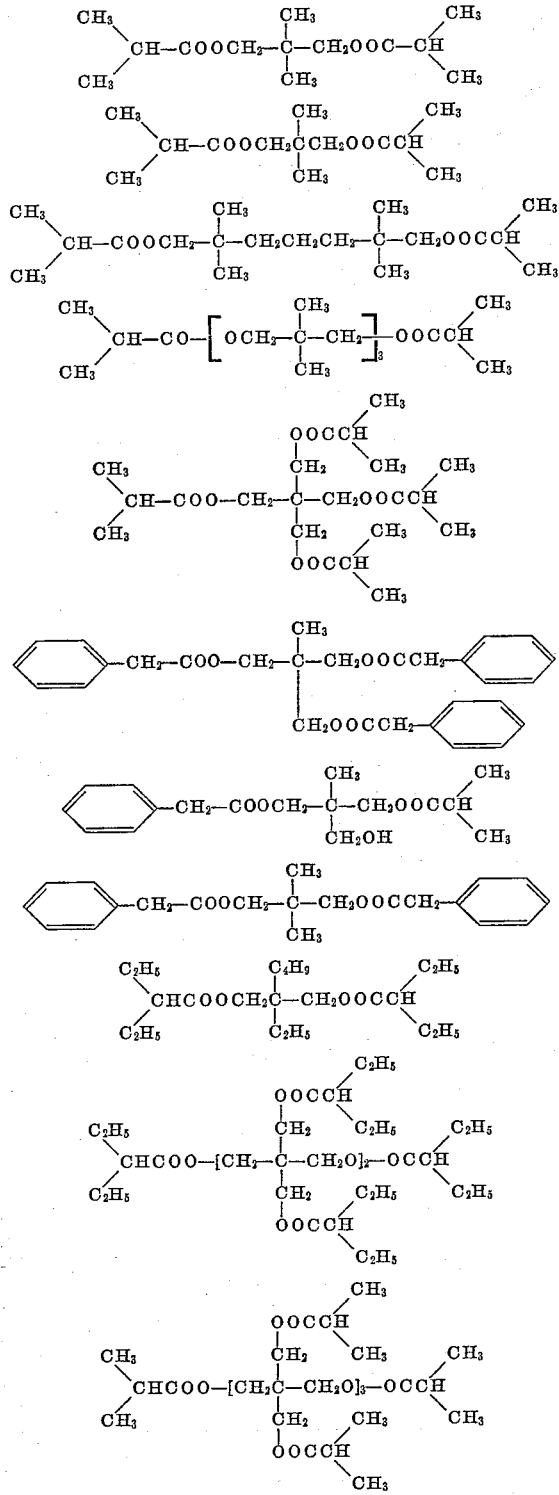

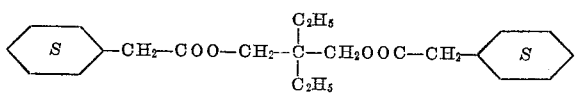

The taxogen is an unsaturated hydrocarbon having the general formula:

$$RCH=CH_2$$

R is hydrogen or an aliphatic, aromatic or cycloaliphatic radical having from one to sixteen carbon atoms. These olefins are referred to for convenience herein as alpha-olefins.

Typical R radicals are phenyl, methyl, ethyl, isobutyl, n-hexyl, n-amyl, n-butyl, n-propyl, isopropyl, cyclohexyl, cyclopentyl, benzyl, tolyl, xylyl, phenethyl, ethyl phenyl, n-decyl, n-dodecyl, n-tetradecyl, and methyl cyclohexyl.

The telogens used in this invention are believed to react with the alpha-olefin taxogens according to the following equation:

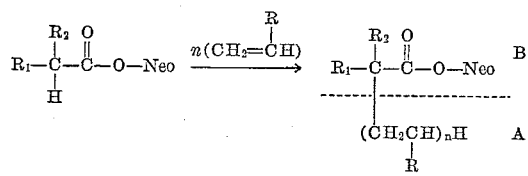

In the above equation, $R_1$ and $R_2$ are as above, and Neo represents the neo polyalcohol unit. $n$ is the number of moles of the olefin in the polyolefin hydrocarbon unit A.

The above reaction mechanism has been tentatively confirmed by infrared analysis of the telomeric product. When the beta-neo ester contains two or more labile hydrogens, serving as hydrocarbon-reactive sites, the telomerization may occur at any or all such sites, depending upon the reaction conditions, and the amounts and kinds of olefin and free radical initiator available for the telomerization.

The taxogen used to produce the less viscous oils preferably is a mixture of ethylene with other alpha olefins containing at least 50 mole percent (50% of total moles) but not over 90 mole percent of ethylene. When two or more α-olefin taxogens are employed, the resultant product is referred to herein as a cotelomer. The telomers obtained using ethylene alone or in amounts of more than 90 mole percent are more viscous, and at the higher ethylene pressures may contain small quantities of high molecular weight, high melting waxes. Waxes are not desired, and the production of waxes as the final product is outside the scope of the invention. The formation of such waxes can be minimized by using low or only moderate ethylene pressures, below about 1500 p.s.i.

The alpha olefins higher than ethylene react more slowly, and less completely, than does ethylene. The larger the amount of branching, in the olefin, the less the reactivity, also. These factors contribute to the formation of an oil. Hence, telomers composed partially or wholly of higher olefins, such as butene-1, pentene-1, 4-methyl pentene-1, 3-methyl hexene-1, hexene-1, heptene-1, octene-1, decene-1, styrene and 8-p-menthene, are of lower molecular weight, and are free flowing non-viscous liquids.

In each instance, the inclusion of even a small amount of higher olefins modifies the nature of the reaction product by lowering the melting or pour point. Thus, by appropriate adjustment of the proportion of a mixture of ethylene and higher alpha olefin, and the particular higher alpha olefin, it is possible to prepare a wide variety of liquid products, ranging from light fluids to highly viscous oils. The extent of branching and the molecular weight determines its melting or pour point.

The reaction requires a free radical initiator, and this substance can be any of those well known to those skilled in the art as useful in the telomerization of ethylene. It should be sufficiently active to decompose freely into free radicals under the reaction conditions which can be employed.

An initiator is required which is capable of depriving the telogen of its active hydrogen, and starting the series of reactions which leads to the telomer. Free radicals are required which are active at the temperatures permissible in telomerization reactions. Furthermore, the telomerization reaction chain is easily interrupted and the reaction halted by conventional free radical inhibitors, and the reactants should be relatively free from such inhibitors.

Initiators which may be used include diacyl peroxides such as diacetyl peroxide, benzoyl peroxide, dipropionyl peroxide, dibutyryl peroxide, and dilauroyl peroxide, dialkyl and bis(arylalkyl) peroxides such as di-tert-butyl peroxide, dihexyl peroxide, di-isopropyl peroxide, di-isobutyl peroxide, di-2-ethylhexyl peroxide, di-n-butyl peroxide, diethyl peroxide, 2-dicumyl peroxide; terpene peroxides, dicyclo-aliphatic peroxides such as dicyclohexyl peroxide; alkyl, arylalkyl and arylcycloalkyl hydroperoxides such as tert-butyl hydroperoxide, cumyl hydroperoxide and tetralin hydroperoxide, perhalogen compounds such as hexachlorethane, and combinations thereof with dialkyl peroxides, organometallic compounds such as tetraethyl lead, tetraphenyl lead, and azo-N=N-compounds such as azobis(isobutyronitrile), azobis(cyclohexane nitrile), and diazoaminobenzene.

Di-tert-butyl peroxide is a preferred free radical initiator for use in this invention, because it exhibits stable decomposition kinetics under most reaction conditions.

The stability of free radical initiators is customarily evaluated in terms of half-life at a stated temperature, and the following table compares this for several commercially available free radical initiators:

TABLE I

| Compound | Temp. (° C.) | Half Life (Hours) | No. Moles of Radical Produced Per Pound |
|---|---|---|---|
| 1. Tetraethyl Lead | 50 | | 5.62 |
| 2. Lauroyl Peroxide | 70 | 54.2 | 2.27 |
| | 85 | 3.4 | |
| | | 0.5 | |
| 3. Dicumyl Peroxide | 115 | 12.4 | 3.34 |
| | 130 | 1.8 | |
| | 145 | 0.38 | |
| 4. Di-tert-butyl Peroxide | 100 | 218 | 6.20 |
| | 115 | 34 | |
| | 130 | 6.4 | |
| | 145 | 1.4 | |
| | 160 | 0.24 | |
| 5. Benzoyl Peroxide | 70 | 13.0 | 3.74 |
| | 85 | 2.15 | |
| | 100 | 0.40 | |
| 6. 2,4-Dichlorobenzoyl Peroxide | 50 | 17.8 | 2.38 |
| | 70 | 1.41 | |
| | 85 | 0.25 | |
| 7. Azobis(isobutyronitrile) | 80 | 1.26 | 5.50 |

In general, the half-life of the free radical initiator employed at the reaction temperature should be within the range from about 0.25 to about 10 hours, since such initiators have been found to give the best results. By suitable modification of the reaction conditions, however, it is possible to employ free radical initiators whose half-life is outside of this range.

The reaction conditions can be widely varied. If ether linkages are present, the conditions should be such that excessive ether cleavage does not occur. The preferred reaction temperature is established by the temperature at which the free radical initiator decomposes to give a rapid liberation of a substantial amount of free radicals within the above-stated range for half-life. For di-tertiary-butyl peroxide, for example, the table shows that the preferred reaction temperatures are within the range from 125 to 160° C. At reaction temperatures below this, because of the slower evolution of free radicals, the reaction time tends to be quite long. Higher temperatures may be wasteful, since the free radical initiator may be decomposed at a higher rate than can be utilized in the telomerization, so that the free radicals will be lost and therefore wasted. In general, for heat-decomposable free radical initiators, reaction temperatures within the range from 50 to 300° C. are useful.

If the boiling point of the alpha-olefin is low, it is necessary to operate under pressure. Pressures of from 10 to 5,000 p.s.i. may be employed, but pressures from 100 to 1,500 p.s.i. are preferred.

If the free radical initiator is decomposable by radiation, such as by ultraviolet rays, such radiation can be used, and it may then be unnecessary to heat the reaction mixture above room temperature. Azobis(cyclohexane nitrile) and azobis(isobutyronitrile) are initiators of this type, and in fact the latter initiator could be used to carry out a telomerization at temperatures below 0° C.

If the reactants are liquids at the reaction temperature, no solvent is necessary unless dilution is desired to maintain control of the reaction rate. However, a solvent for the alpha-olefin will assist in bringing it into contact with the telogen, and it may be possible because of this facilitation of the reaction to use less olefin in the reaction mixture. A solvent also may be desirable when the telogen is a solid in order to increase the reaction rate.

The solvent should be inert under the telomerization reaction conditions. Suitable solvents include benzene, cyclohexane, n-octane and iso-octane. Preferably, the reaction mixture is agitated.

The reaction initially is exothermic, and requires careful control to prevent the temperature from rising so high that free radical initiator decomposition becomes too rapid. As the reaction proceeds, less heat is liberated, and it may be necessary to heat the reaction mixture in order to bring the reaction to completion.

The reaction time will depend upon the initiator and the reactants, the concentrations thereof, and the reaction temperature. It is usually convenient to employ reaction conditions such that the reaction can be complete in an hour or less, but of course, this is a matter of choice, and reaction times as long as thirteen to fifty hours may not be out of line, depending upon the need. Pentaerythritol tetraisobutyrate and ethylene react rapidly at 130° C. in the presence of di-tert-butyl peroxide to produce a high conversion within an hour.

A high olefin concentration, particularly in the case of ethylene and ethylene-rich mixtures, will yield a higher molecular weight product than will a lower olefin concentration. A lower temperature has the same effect. For a given olefin at any given concentration, the average molecular weight of the product may be increased by operating at the minimum temperature permitted by the decomposition temperature of the free radical initiator, so as to obtain a slow evolution of free radicals, but such reactions will require a long time to complete. The same effect may be obtainable by incorporating an inert diluent which is a good solvent for the alpha-olefin.

The reaction is easily carried out in conventional pressure equipment. The reactants are introduced, and the equipment brought to the reaction conditions desired.

The ingredients may be brought together in any order but preferably, the beta-neo ester, the alpha-olefin, and the solvent, if one is employed, are first mixed together and the free radical initiator is then added incrementally. If the alpha-olefin is a gas such as ethylene, the reaction vessel may be run at a constant olefin gas pressure throughout the reaction during the addition of the free radical initiator. In this manner, greater telogen conversions may be obtained together with the production of telomers of a more uniform average molecular weight distribution.

Usually, successful reactions are noticeably exothermic, especially in the early stages of reaction, and cooling is often necessary to control the reaction, especially during this early phase. Often, the course of reaction is followed from a drop in olefin pressure. The final reaction product is stripped of volatiles by treating the warm product with a stream of air at 90–100° C. Alternatively, the product may be stripped of volatiles under a vacuum. The stripped product is then cooled to 0–20° C. and, if necessary, treated with fuller's earth or preferably bentonite clay in order to remove the small quantity of wax usually present, as from reactions run at relatively high ethylene pressures.

A continuous reaction is of particular interest in a commercial process. This is readily effected by suitable equipment which permits continuous blending of the beta-neo ester with the alpha-olefin and free radical initiators, holding them in a pressurized reaction chamber in which they have a dwell time equivalent to that required to substantially complete the reaction, and then drawing them off to a working-up chamber where the solvent is removed and the residue recovered.

Telomer products are obtainable having a wide range of molecular weights which vary according to the reactants, reaction conditions and concentration of reactants. The molecular weight can range from as low as 300 up to about 2,000. The low molecular weight materials are light oils. The high molecular weight materials are viscous oils.

The following examples in the opinion of the inventor represent the best embodiments of his invention.

*Example 1*

Into a Magne-Dash 500 ml. capacity autoclave provided with means for external heating and with a cooling coil for internal cooling, and a stirrer, were placed 140 g. of pentaerythritol tetraisobutyrate and 7 g. of di-tertiary-butyl peroxide. The autoclave and contents were flushed with nitrogen to expel air. To this was then added ethylene gas at 70° F. to a total pressure of 860 p.s.i. The contents were slowly heated to 251° F. (pressure of 1330 p.s.i.), and then maintained at 251 to 294° F. for an additional fifteen hours. At the end of this time the final pressure was 750 p.s.i. The system was vented to the atmosphere to liberate excess olefin.

161 grams of the crude liquid telomeric product was poured into five times its weight of acetone, whereupon a small quantity, 9.8 g. of wax (saponification number 24.5) precipitated. The wax-free filtrate was stripped of acetone, and the product obtained, 145 g., subjected to vacuum distillation. The following fractions were collected:

| Fraction | Boiling Point | Weight collected, g. |
|---|---|---|
| I | to 185° C., 0.46 mm | 67.2 |
| II | 184–195° C., 0.46–0.41 mm | 11.0 |
| III | 195–205° C., 0.41–0.41 mm | 11.2 |
| IV | 205–215° C., 0.41–0.44 mm | 9.4 |
| R | Residual, above 215° C., 0.44 mm | 43.8 |

The oily residue had a molecular weight of 798, viscosity of 1612 SSU at 100° F., 96 SSU at 210° F., and a viscosity index of 61. This was a synthetic bright stock, with excellent lubricant properties.

The weight percent of bright stock in the crude product was 27, representing approximately a 17% conversion of the telogen and a 45% conversion of the olefin on the basis of the total telogen converted.

Twenty parts of the oil was diluted with eighty parts of solvent-extracted neutral lubricating oil stock 140 SSU at 100° F., producing a stable oil solution containing 20% telomer by weight. This solution was stable on standing.

The telomer oil, alone or in solution in mineral lubricating oil, was useful as a lubricating oil, as a kiln lubricant, as a hydraulic fluid and as a plasticizer for synthetic polymers.

*Example 2*

Example 1 was repeated, using 136 g. of pentaerythritol tetraisobutyrate and 6.5 g. of di-tertiary-butyl peroxide.

The initial autoclave pressure of ethylene was 1700 p.s.i. at 210° F. The contents were maintained to 260 to 293° F. for a period of twelve hours, at the end of which time the pressure was 760 p.s.i. at 293° F. Excess olefin was vented off to obtain the crude product. The crude product (159 grams) was poured into five times its weight of acetone, whereupon 17.3 g. of wax (saponification number 70) precipitated. The acetone was stripped off and the 135 g. of dewaxed material obtained subjected to vacuum distillation, the following fractions being collected:

| Fraction | Boiling Poin | Weight collected, g. |
| --- | --- | --- |
| I | to 198° C., 0.96 mm | 72.7 |
| II | 198-211° C., 0.96-1.00 mm | 11.7 |
| III | 211-227° C., 1.00-1.00 mm | 8.7 |
| IV | 227-249° C., 1.00-1.25 mm | 14.0 |
| R | Residue, above 249° C., 1.25 mm | 27.6 |

The residual material had a molecular weight of 749, a viscosity of 1146 SSU at 100° F., 89 SSU at 210° F., and a viscosity index of 83.

The weight percent of bright stock in the crude product was 17%, representing approximately a 12% conversion of the telogen and a 59% conversion of the olefin on the basis of the total telogen converted.

The telomer oil, alone or in solution in mineral lubricating oil, was useful as a lubricating oil, as a kiln lubricant, as a hydraulic fluid and as a plasticizer for synthetic polymers.

*Example 3*

Into a one gallon capacity Magne-Dash autoclave was placed 500 g. of pentaerythritol tetraisobutyrate, 25 g. of di-tertiary-butyl peroxide and 500 g. of benzene (Reagent grade). The autoclave and contents were purged of air by means of a vacuum and by flushing with nitrogen gas, and then pressured up with ethylene to 1990 p.s.i. at 260° F. The contents were slowly brought to 270° F. and held within the range from 270 to 298° F. for seventeen hours. Then the excess olefin was vented to the atmosphere.

The crude product was withdrawn and treated with six times its weight of acetone, whereupon 365 g. of wax (molecular weight 1061) precipitated. The acetone and benzene were stripped from the wax-free filtrate and the 768 g. of product obtained subjected to vacuum distillation. The following fractions were collected:

| Fraction | Boiling Point | Weight collected, g. |
| --- | --- | --- |
| 0 | to 156° C., 24 mm | None |
| I | 156-227° C., 24-0.5 mm | 263 |
| R | Residue, above 227° C., 0.5 mm | 505 |

The residual oil had a molecular weight of 961, a viscosity of 1353 SSU at 100° F., 120 SSU at 210° F., and a viscosity index of 112.

The weight percent of bright stock in the crude product was 45%, representing approximately a 44% conversion of the telogen and a 65% conversion of the olefin, on the basis of the total telogen converted.

The telomer oil, alone or in solution in mineral lubricating oil, was useful as a lubricating oil, as a kiln lubricant, as a hydraulic fluid and as a plasticizer for synthetic polymers.

*Example 4*

Trimethylolpropane triisobutyrate was prepared from trimethylolpropane and isobutyric acid in the presence of a mineral acid catalyst. The fraction of purified material boiling at 144° C. (0.55 mm.) to 161° C. (0.9 mm.) was employed for the following preparation.

Into a 500 ml. capacity Magne-Dash autoclave was placed 140 g. of trimethylolpropane triisobutyrate and 7 g. of di-tertiary-butyl peroxide. The autoclave and contents were purged of air by means of nitrogen and then pressured up with ethylene to 1200 p.s.i. at 166° F. The contents were maintained at 250–284° F. for fourteen hours, at the end of which time the final pressure at 284° F. was 560 p.s.i. The excess olefin was then vented off, yielding 168 g. of nearly wax-free product. After separation of wax, as described in the preceding examples, 160 g. of wax-free material was obtained yielding the following fractions upon vacuum distillation:

| Fraction | Boiling Point | Weight collected, g. |
| --- | --- | --- |
| I | to 170° C., 0.5 mm | 80.5 |
| II | 170-185° C., 0.5-0.46 mm | 18.7 |
| III | 185-200° C., 0.46-0.40 mm | 11.5 |
| R | Residue, above 200° C., 0.40 mm | 47.6 |

This thick oily residue had a molecular weight of 628, viscosity of 803 SSU at 100° F., 71 SSU at 210° F., and viscosity index of 72.

The weight percent of bright stock in the crude product was 30%, representing approximately a 19% conversion of the telogen and a 63% conversion of the olefin, on the basis of the total telogen converted.

Fourteen parts of the telomer was diluted with 86 parts by weight of solvent-extracted neutral lubricating oil stock 140 SSU at 100° F. The resulting oil solution contained 14 percent telomer, and was stable on standing.

The telomer oil, alone or in solution in mineral lubricating oil, was useful as a lubricating oil, as a kiln lubricant, as a hydraulic fluid and as a plasticizer for synthetic polymers.

*Example 5*

Into an evacuated one gallon Magne-Dash autoclave were placed 500 g. of pentaerythritol tetraisobutyrate, 26.5 g. di-tertiary-butyl peroxide, and 544 g. of benzene (Reagent grade). Liquified propylene (approximately 500 g.) was charged to the autoclave under nitrogen to a pressure of 450 p.s.i. at 60° F. Ethylene was then added to a total pressure of 860 p.s.i. at 60° F. The autoclave and contents were slowly brought to 250° F. (1560 p.s.i.) and then maintained at 280–299° F. for fifteen hours. At the end of this time the final pressure was 1210 p.s.i. at 294° F. Upon release of excess olefin, stripping off the volatiles, and subjecting the product to vacuum distillation, the following fractions were obtained:

| Fraction | Boiling Point | Weight collected, g. |
| --- | --- | --- |
| I | to 180° C., 0.42 mm | 324.0 |
| II | 180-201° C., 0.42-0.55 mm | 32.4 |
| III | 201-225° C., 0.55-0.70 mm | 32.9 |
| R | Residue, above 225° C., 0.70 mm | 277.0 |

Fraction I crystallized on cooling and consisted predominately of unreacted pentaerythritol tetraisobutyrate (boiling point 170° C. (0.3 mm.) to 176° C. (0.25 mm.)).

The weight percent of residual bright stock in the crude product was 42%, representing approximately a 23% conversion of the telogen and a 13% conversion of the olefin on the basis of the total telogen converted.

The telomer oil, alone or in solution in mineral lubricating oil, was useful as a lubricating oil, as a kiln lubricant, as a hydraulic fluid and as a plasticizer for synthetic polymers.

I claim:

1. A free-flowing liquid telomer composed of carbon, hydrogen, and oxygen having a molecular weight below 2,000 and containing in the molecule a β-neopolyalcohol-organic α-substituted carboxylic acid ester unit.

2. A free-flowing liquid telomer composed of carbon, hydrogen, and oxygen having a molecular weight below 2,000 and containing in the molecule a β-neoglycol-organic α-substituted carboxylic acid ester unit.

3. A free-flowing liquid telomer composed of carbon, hydrogen, and oxygen having a molecular weight below 2,000 and containing in the molecular a pentaerythritol-organic α-substituted carboxylic acid ester unit.

4. A free-flowing liquid olefin telomer composed of carbon, hydrogen, and oxygen having a molecular weight below 2,000 and containing in the molecule a trimethylolpropane-organic α-substituted carboxylic acid ester unit.

5. A free-flowing liquid cotelomer composed of carbon, hydrogen, and oxygen of at least two olefins having a molecular weight below 2,000 and containing in the molecule a β-neopolyalcohol-organic α-substituted carboxylic acid ester unit.

6. A free-flowing liquid cotelomer in accordance with claim 5 having a molecular weight below 2,000 and containing mixed ethylene and a higher α-olefin.

7. A free-flowing liquid cotelomer in accordance with claim 6 in which the proportion of ethylene is within the range from 50 to 90 mole percent.

8. A process for producing a free-flowing liquid olefin telomer composed of carbon, hydrogen, and oxygen having a molecular weight below 2,000 and containing in the molecule a β-neopolyalcohol-organic α-substituted carboxylic acid ester unit, which comprises telomerizing an α-olefin taxogen having from about two to about twelve carbon atoms with a β-neopolyalcohol ester of an organic carboxylic acid in the presence of a free radical initiator capable of initiating the telomerization at a temperature at which an evolution of free radicals from the initiator is obtained.

9. A process in accordance with claim 8 in which the temperature is within the range from 50 to 300° C.

10. A process in accordance with claim 8 in which the α-olefin is a mixture of ethylene with a higher α-olefin.

11. A process in accordance with claim 10 in which the α-olefin is a mixture of ethylene and propylene.

12. A process in accordance with claim 10 in which the proportion of ethylene is within the range from 50 mole percent to 90 mole percent.

13. A process in accordance with claim 8 in which the α-olefin is ethylene.

14. A process in accordance with claim 8 in which the free radical initiator is a dialkyl peroxide.

15. A process in accordance with claim 8 in which the telogen is a β-neoglycol ester of an organic carboxylic acid.

16. A process in accordance with claim 8 in which the telogen is a pentaerythritol ester of an organic carboxylic acid.

17. A process in accordance with claim 8 in which the telogen is a trimethylolpropane ester of an organic carboxylic acid.

18. A process in accordance with claim 8 in which the telogen is pentaerythritol tetraisobutyrate.

19. A process in accordance with claim 8 in which the telogen is trimethylolpropane triisobutyrate.

References Cited in the file of this patent

UNITED STATES PATENTS 2,402,137     Hanford et al.     June 18, 1946